US012301527B2

(12) United States Patent
Boyd et al.

(10) Patent No.: US 12,301,527 B2
(45) Date of Patent: May 13, 2025

(54) GENERATION OF ELECTRONIC MEDIA CONTENT COLLECTIONS

(71) Applicant: Snap Inc., Santa Monica, CA (US)

(72) Inventors: Nathan Kenneth Boyd, Los Angeles, CA (US); Jonathan Brody, Marina Del Rey, CA (US); Ken W. Chung, Los Angeles, CA (US); Justin Huang, Los Angeles, CA (US); Teresa Lieh, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/349,706

(22) Filed: Jul. 10, 2023

(65) Prior Publication Data

US 2023/0353519 A1 Nov. 2, 2023

Related U.S. Application Data

(63) Continuation of application No. 16/881,811, filed on May 22, 2020, now Pat. No. 11,700,220, which is a continuation of application No. 15/905,486, filed on Feb. 26, 2018, now Pat. No. 10,693,819.

(60) Provisional application No. 62/599,508, filed on Dec. 15, 2017.

(51) Int. Cl.
| | |
|---|---|
| *G06F 15/16* | (2006.01) |
| *G06F 16/438* | (2019.01) |
| *G06F 16/44* | (2019.01) |
| *H04L 51/10* | (2022.01) |
| *H04L 51/18* | (2022.01) |
| *H04L 51/52* | (2022.01) |

(52) U.S. Cl.
CPC .......... *H04L 51/10* (2013.01); *G06F 16/4393* (2019.01); *G06F 16/447* (2019.01); *H04L 51/18* (2013.01); *H04L 51/52* (2022.05)

(58) Field of Classification Search
CPC ......... H04L 51/10; H04L 51/52; H04L 51/18; G06F 16/4393; G06F 16/447
USPC ......................................... 709/206, 217–219
See application file for complete search history.

(56) References Cited

U.S. PATENT DOCUMENTS

| | | | |
|---|---|---|---|
| 8,584,015 B2* | 11/2013 | Osten | G06F 16/29 715/202 |
| 9,563,607 B2 | 2/2017 | Asver et al. | |
| 10,693,819 B1 | 6/2020 | Boyd et al. | |
| 11,700,220 B2 | 7/2023 | Boyd et al. | |
| 2002/0070982 A1* | 6/2002 | Hill | G06F 3/0481 715/835 |
| 2005/0243381 A1* | 11/2005 | Hill | H04N 1/00148 358/1.15 |
| 2008/0309795 A1* | 12/2008 | Mitsuhashi | H04N 5/775 348/E5.022 |

(Continued)

OTHER PUBLICATIONS

"U.S. Appl. No. 15/905,486, Final Office Action mailed Nov. 29, 2019", 7 pgs.

(Continued)

*Primary Examiner* — Kaylee J Huang
(74) *Attorney, Agent, or Firm* — Schwegman Lundberg & Woessner, P.A.

(57) ABSTRACT

Among other things, embodiments of the present disclosure improve the functionality of electronic messaging software and systems by automatically analyzing media content associated with a user and generating collections of such content (e.g., "stories") based on varying criteria.

20 Claims, 16 Drawing Sheets

(56) References Cited

U.S. PATENT DOCUMENTS

| | | | |
|---|---|---|---|
| 2009/0313267 A1* | 12/2009 | Girgensohn | G06F 16/44 |
| 2010/0042926 A1 | 2/2010 | Bull et al. | |
| 2012/0050789 A1* | 3/2012 | Bachman | G06F 3/0483 |
| | | | 715/810 |
| 2012/0233256 A1 | 9/2012 | Shaham et al. | |
| 2013/0117365 A1 | 5/2013 | Padmanabhan et al. | |
| 2014/0074857 A1 | 3/2014 | Liu et al. | |
| 2014/0143247 A1 | 5/2014 | Rathnavelu et al. | |
| 2015/0177964 A1 | 6/2015 | Spirer | |
| 2015/0193894 A1 | 7/2015 | Folkman | |
| 2015/0295092 A1 | 10/2015 | Misaki | |
| 2015/0373116 A1 | 12/2015 | Mo et al. | |
| 2016/0080452 A1 | 3/2016 | Plumley | |
| 2016/0110355 A1* | 4/2016 | Charania | G06F 16/51 |
| | | | 382/224 |
| 2016/0173625 A1 | 6/2016 | Ruben et al. | |
| 2016/0283483 A1 | 9/2016 | Jiang et al. | |
| 2018/0068019 A1 | 3/2018 | Novikoff et al. | |
| 2018/0253189 A1 | 9/2018 | Jain et al. | |
| 2018/0295092 A1 | 10/2018 | Peiris et al. | |
| 2019/0129962 A1 | 5/2019 | Singh et al. | |
| 2020/0358731 A1 | 11/2020 | Boyd et al. | |

OTHER PUBLICATIONS

"U.S. Appl. No. 15/905,486, Non Final Office Action mailed May 15, 2019", 19 pgs.

"U.S. Appl. No. 15/905,486, Notice of Allowance mailed Feb. 18, 2020", 8 pgs.

"U.S. Appl. No. 15/905,486, Response filed Jan. 29, 2020 to Final Office Action mailed Nov. 29, 2019", 8 pgs.

"U.S. Appl. No. 15/905,486, Response filed Oct. 15, 2019 to Non-Final Office Action mailed May 15, 2019", 11 pgs.

"U.S. Appl. No. 16/881,811, Examiner Interview Summary mailed May 3, 2021", 2 pgs.

"U.S. Appl. No. 16/881,811, Examiner Interview Summary mailed Nov. 17, 2020", 2 pgs.

"U.S. Appl. No. 16/881,811, Final Office Action mailed Feb. 23, 2021", 18 pgs.

"U.S. Appl. No. 16/881,811, Final Office Action mailed Oct. 6, 2022", 18 pgs.

"U.S. Appl. No. 16/881,811, Final Office Action mailed Nov. 26, 2021", 17 pgs.

"U.S. Appl. No. 16/881,811, Non Final Office Action mailed Jun. 23, 2022", 18 pgs.

"U.S. Appl. No. 16/881,811, Non Final Office Action mailed Jun. 30, 2021", 17 pgs.

"U.S. Appl. No. 16/881,811, Non Final Office Action mailed Sep. 9, 2020", 8 pgs.

"U.S. Appl. No. 16/881,811, Notice of Allowance mailed Feb. 23, 2023", 11 pgs.

"U.S. Appl. No. 16/881,811, Response filed Jan. 5, 2023 to Final Office Action mailed Oct. 6, 2022", 14 pgs.

"U.S. Appl. No. 16/881,811, Response filed Feb. 24, 2022 to Final Office Action mailed Nov. 26, 2021", 9 pgs.

"U.S. Appl. No. 16/881,811, Response filed May 24, 2021 to Final Office Action mailed Feb. 23, 2021", 9 pgs.

"U.S. Appl. No. 16/881,811, Response filed Sep. 21, 2022 to Non Final Office Action mailed Jun. 23, 2022", 9 pgs.

"U.S. Appl. No. 16/881,811, Response filed Nov. 1, 2021 to Non Final Office Action mailed Jun. 30, 2021", 9 pgs.

"U.S. Appl. No. 16/881,811, Response filed Nov. 18, 2020 to Non Final Office Action mailed Sep. 9, 2020", 10 pgs.

* cited by examiner

FIG. 5D

"Snap that was taken with temperature over 80 degrees F Bonus if user has added the temperature filter"

I got 1 year older!

"Snap taken on day that matches user's inputted birth date"

I created some Masterpieces

"Snap with >10 brush strokes with pen tool, or Snap with 7 or more stickers added to it"

all in all this year was pretty lit

"Snap with caption matching the word lit"

"Snap with object recognition recognizing a sunset in the photo/video"

as the sun sets on 2017

GENERATION OF ELECTRONIC MEDIA CONTENT COLLECTIONS

CLAIM OF PRIORITY

This application is a continuation of U.S. patent application Ser. No. 16/881,811, filed May 22, 2020, which application is a continuation of U.S. patent application Ser. No. 15/905,486, filed on Feb. 26, 2018, which claims the benefit of priority to U.S. Provisional Application Ser. No. 62/599,508 filed on Dec. 15, 2017, the disclosures of each of which are hereby incorporated by reference in their entireties.

BACKGROUND

The popularity of electronic messaging, particularly instant messaging, continues to grow. Users increasingly share electronic media content items such as electronic images, audio, and video with each other. Users also increasingly utilize their mobile devices to communicate with each other using chat and message programs. Over time, a user may accumulate a large amount of media content associated with various events and time periods. Embodiments of the present disclosure address the generation of collections of such content, as well as other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 5A-5J are diagrams and screenshots illustrating various aspects of the present disclosure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging software and systems by automatically analyzing media content associated with a user and generating collections of such content (e.g., "stories") based on varying criteria.

Figure 1:
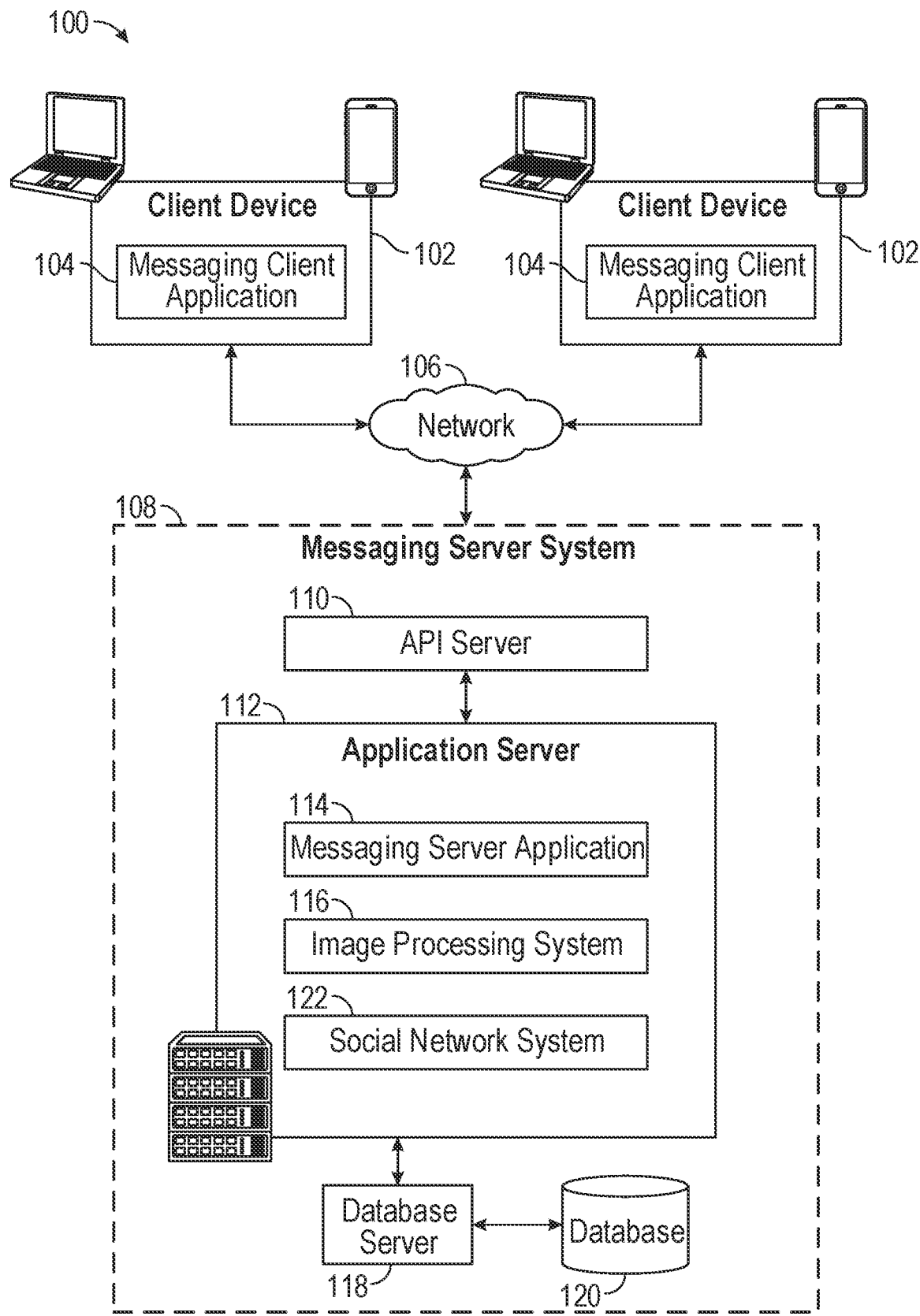
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
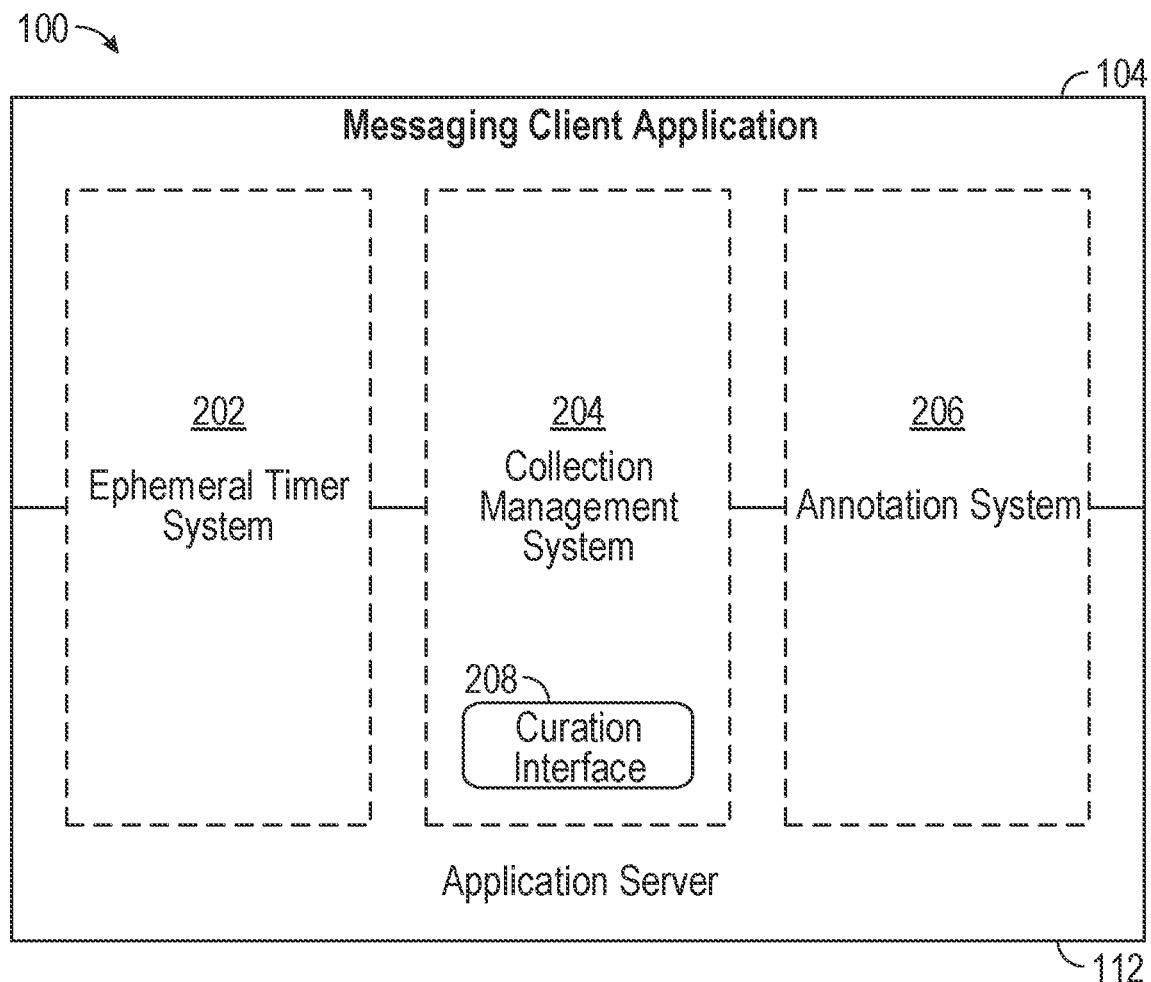
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT® story), selectively display and enable access to messages and associated content via the messaging client application 104.

The collection management system 204 is responsible for managing collections of media (e.g., collections of text, image, video and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages).

Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT® filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 102. For example, the media overlay including text that can be overlaid on top of a photograph/electronic image generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some exemplary embodiments, as discussed in more detail below, embodiments of the present disclosure may generate, display, distribute, and apply media overlays to media content items. For example, embodiments may utilize media content items generated by a client device 102 (e.g., an image or video captured using a digital camera coupled to the client device 102) to generate media overlays that can be applied to other media content items.

Figure 3:
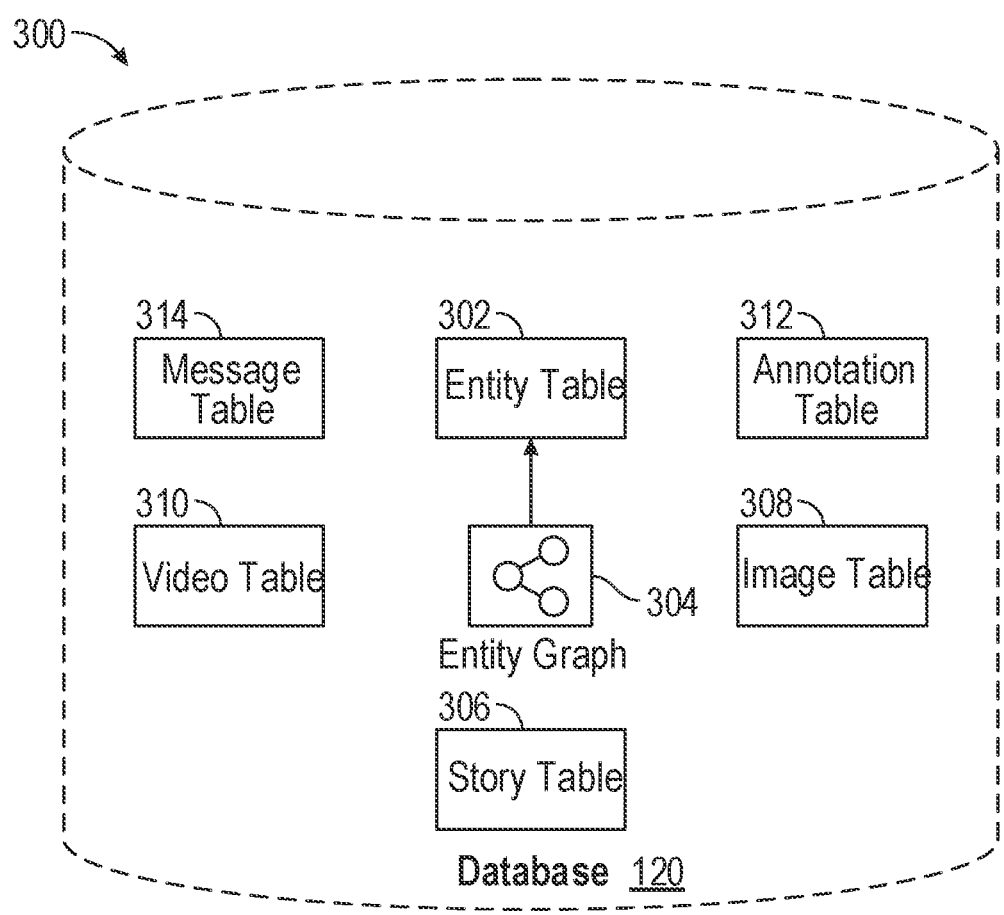
FIG. 3 is a schematic diagram illustrating data which may be stored in the database of the messaging server system, according to various exemplary embodiments.

FIG. 3 is a schematic diagram 300 illustrating data 300 that is stored in the database 120 of the messaging server system 108, according to certain exemplary embodiments. While the content of the database 120 is shown to comprise a number of tables, the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message.

Other types of filters include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time. Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT® story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein. Embodiments of the present disclosure may transmit and receive electronic communications containing media content items, media overlays, and/or other content (or links to such content as described below) using any form of electronic communication, such as SMS texts, MMS texts, emails, and other communications.

Figure 4:
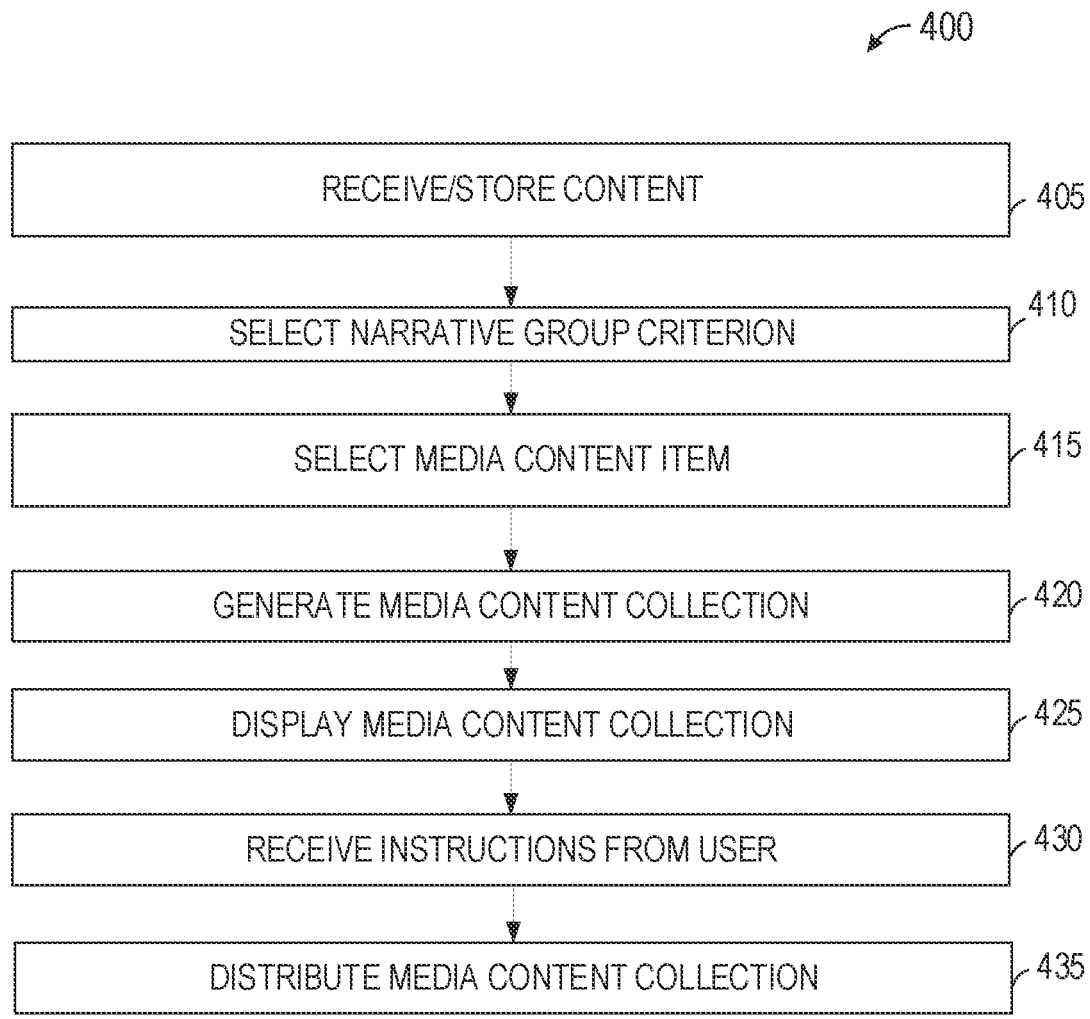
FIG. 4 is a flow diagram of an exemplary process according to various aspects of the disclosure.

FIG. 4 depicts an exemplary process according to various aspects of the present disclosure. In this example, method 400 includes receiving and storing (e.g., in a database in communication with the system) a media content item from the computing device of a user (405), selecting (e.g., from a database in communication with the system) a narrative group criterion (410), selecting a media content item associated with the narrative group criterion and the user (415), generating a media content collection that includes the selected media content item (420), displaying (425) the media content collection (e.g., on the display screen of the user's computing device), receiving instructions from the user (430), and distributing the media content collection (435). The steps of method 400 may be performed in whole or in part, may be performed in conjunction each other as well as with some or all of the steps in other methods, and may be performed by any number of different systems, such as the systems described in FIGS. 1 and 7.

Embodiments of the present disclosure may receive a variety of different forms of content (405) from a variety of sources. For example, the system (e.g., messaging server system 108 in FIG. 1) may receive (405) an electronic communication transmitted from a client computing device of a user (e.g., client device 102 in FIG. 1) over a network such as the Internet (e.g., network 106 in FIG. 1) containing one more media content items that include content such as an image, text, audio, and/or video. Embodiments of the present disclosure may transmit and receive electronic communications containing media content items, media overlays, or other content any form of electronic communication, such as SMS texts, MMS texts, emails, and other communications. Media content items included in such communications may be provided as attachments, displayed inline in the message, within media overlays, or conveyed in any other suitable manner.

Additionally or alternatively, the system may retrieve media content posted to online social networks by the user. The system may also receive or collect media content items associated with a user from media content stored locally on the user's mobile device. For example, a user may generate electronic images, video, audio, text files, etc. and store such content in the memory of the user's device. In some embodiments, the system may, with the user's authorization, collect such content and select media content for the media content collections. In this manner, the system can generate media content collections using content the user may never have shared with anyone else, and may have even forgotten about.

Figure 5A:
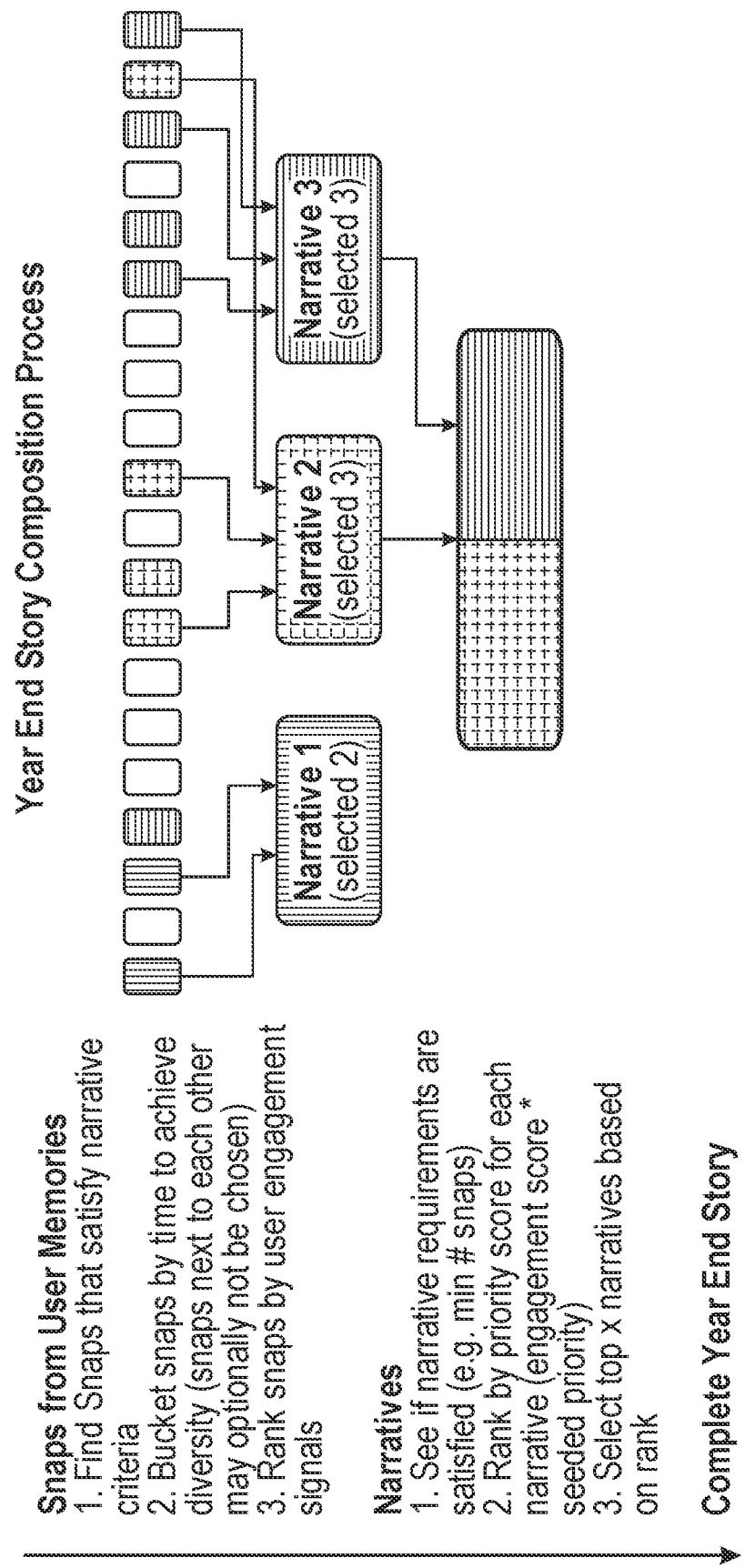

The system selects (410) one or more narrative group criteria for generating the media content collection. FIG. 5A illustrates an example of an embodiment that generates a collection of media content (which may be referred to herein as "stories," as noted above) over a predetermined time period. In this example, the system generates a "Year End Story" for the calendar year.

In FIG. 5A, the identified narrative group criteria define the narrative groups are the building blocks to the Year End Story. They can be excluded from a user's Year End Story if they do not have enough snaps in their memories to meet a minimum required number for that Narrative Group. Each Narrative group may have its own set of criteria and requirements. Each narrative group may also have any number of sub-narratives (also defined by their respective sets of criteria and requirements) that may be placed into the overall narrative.

In the example shown in FIG. 5A and subsequent illustrations, the system operates with media content in the form of "Snaps" generated by the "Snapchat" application from Snap, Inc. However, embodiments of the present disclosure may operate in conjunction with media content generated using any desired application and stored in any format. In the example in FIG. 5A, a narrative group may be prefaced with a single Title Snap, particularly where there are no sub-narratives.

In some embodiments, if a narrative group instead has sub-narratives, each sub-narrative will be prefaced with a Title snap. These Title Snaps may be generated by the system to introduce a series of one or more user snaps that follow each Title Snap. In this example, the narrative groups are listed in sequential order as they would exist in the overall narrative. A Title Snap may include, for example, animated video with text, and a static overlay of the user's bitmoji (if available). In this context, a "bitmoji" refers to an avatar associated with the user.

The process for generating the Year End Story is summarized at the left side of FIG. 5A, taken in conjunction with the process described in FIG. 4. In this example, for each narrative group, the system filters the subset of snaps that fit a set of criteria selected (410) for the narrative group. Narrative group criteria examples are described in more detail below.

The system may select a plurality of media content items associated with the user and a each narrative group criterion, and select a plurality of media content items associated with the first narrative group criterion by organizing each media content item into a plurality of categories based on a time the media content item was generated and/or an event associated with the media content item. In FIG. 5A, for example, for each valid subset of Snaps in each narrative group, the system buckets the Snaps by month, though other time periods (e.g., a week, a day, etc.) could also be used. As shown in FIG. 5E, media content items are categorized based on a day (e.g., "Throwback Thursday"), a month ("September Replay"), and a daily time frame from a period in the past ("One Year Ago Today"). Similarly, as noted above, FIG. 5E depicts media content is categorized based on an event, namely a user's "Trip to San Diego Zoo."

The system may, as shown in FIG. 5A, selects a plurality of narrative group criteria for a respective plurality of narrative groups. The system may identify any number of different media content items associated with the user and each narrative group criterion in the plurality of narrative group criteria. In some cases, the same media content item may be identified for multiple narrative groups. In other cases, the system may limit media content items to being associated with a predetermined number (e.g., one) narrative group. The system may select at least a portion of the identified media content items identified across the plurality of narrative group criteria for inclusion in the generated media content collection, such as the Year End Story in FIG. 5A.

In some embodiments, selecting (415) the plurality of media content items associated with a narrative group criterion includes ranking each media content item within each category, and selecting the media content items for the media content collection based on the ranking. For example, in FIG. 5A, within each time-based category, the system ranks the Snaps by engagement score. The engagement score may be determined based on a variety of different factors. For example, the engagement score may be determined based on one or more of: a number of times the respective media content item is viewed, a number of times the respective media content item is distributed, a number of comments associated with the respective media content item, a keyword in the respective media content item, an image in the respective media content item, video in the respective media content item, and audio in the respective media content item.

The system may select the media content items (415) for the media content collection by selecting no more than a predetermined number of media content items from each category. For example, in FIG. 5A the system may draw a predetermined number of the top Snaps by rank, but not drawing from the same bucket/category twice to achieve time diversity.

In some embodiments, selecting media content items identified across the plurality of narrative group criteria for inclusion in the generated media content collection further includes selecting media content items associated with narrative group criteria that meet a set of minimum criteria. In FIG. 5A, for example, for each narrative group, the system filters narrative groups to a subset of narratives that meet a minimum criteria (e.g., minimum number of Snaps/media content items associated with the narrative group, and/or a minimum total engagement score for the narrative group. A narrative group defined by a set of narrative group criteria, for example, may be associated with ten media content items each having varying engagement scores (determined as described above). In some embodiments, the total engagement score for the media content associated with the narrative group criteria may be the sum of the engagement scores for all media content items, the average of the scores, a weighted score based on the characteristics of the individual media content items (with some content items affecting the total engagement score more than others), or based on other calculations.

In some embodiments, selecting media content items identified across the plurality of narrative group criteria for inclusion in the generated media content collection includes selecting media content items associated with at least a portion of the plurality of narrative group criteria based on a respective ranking for each narrative group criterion. The ranking of each respective narrative group criterion may be based on a pre-seeded value for the respective narrative group criterion, and/or a total engagement score for the respective narrative group criterion. The system may select media content items associated with a subset of the plurality of narrative group criteria that have a ranking above a predetermined threshold.

In FIG. 5A, for example, the system ranks each narrative group using a scoring calculation (e.g., pre-seeded narrative values * total narrative engagement score), and selects a predetermined number of top narratives based on rank to string together to form a narrative. The Year End Story may thus follow a pre-defined narrative with a set of Narrative Groups that satisfy a minimum threshold of satisfying Snaps to be included in the overall Narrative. Access to, and display of, media content collection generated by embodiments of the present disclosure (such as the Year End Story generated in FIG. 5A) may be ephemerally limited by embodiments of the present disclosure. In some embodiments, for example, the system allows the media content collection to be displayed on the display screen of a user's computing device and/or the computing devices of other users to whom the media content collection is shared/distributed, for a predetermined period of time. Additionally or alternatively, the system may allow the media content collection to be displayed a predetermined number of times. In the example shown in FIG. 5A, for instance, the Year End Story may be accessed by the user and others the user shares/distributes the Year End Story to from December 31 to January 14. Additionally, once a user has viewed the Year End Story in full, it will be removed from access (e.g. disappear from their "memories" section of their messaging application) 48 hours after they've viewed it.

The system may also alter the classification of a media content collection based on time or other events. For example, a recently-created media content collection such as the Year End Story may be given a prioritized "featured" status for a predetermined time period, until the generating user views the collection, until a predetermined number of other users have viewed the collection, and/or based on other criteria. In a particular example, in response to a user saving their Year End Story, the system removes the collection as a "featured story" from the user's gallery of stories.

Figure 5B:
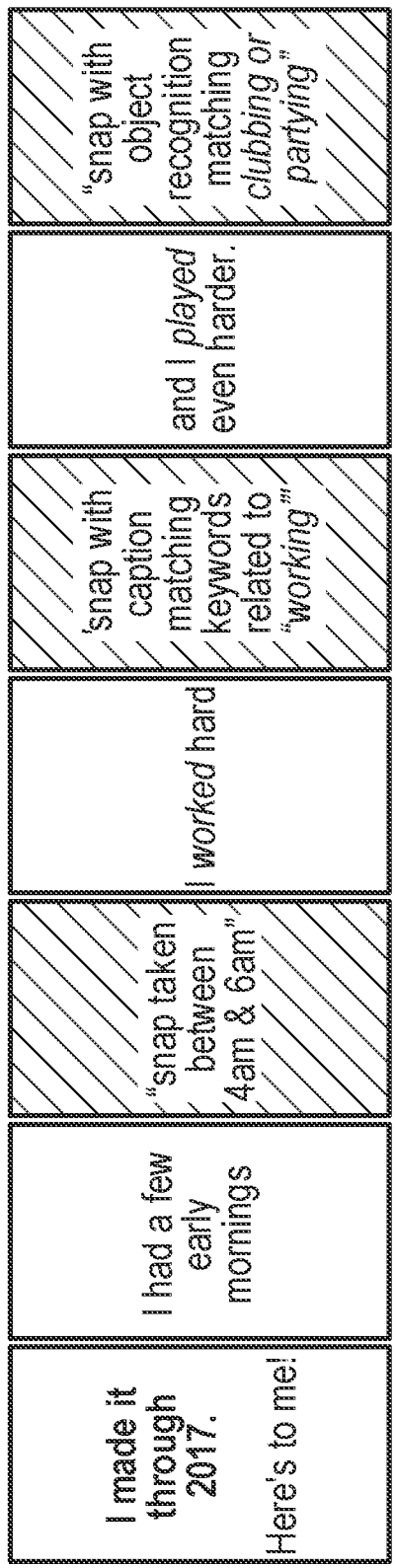
Figure 5C:
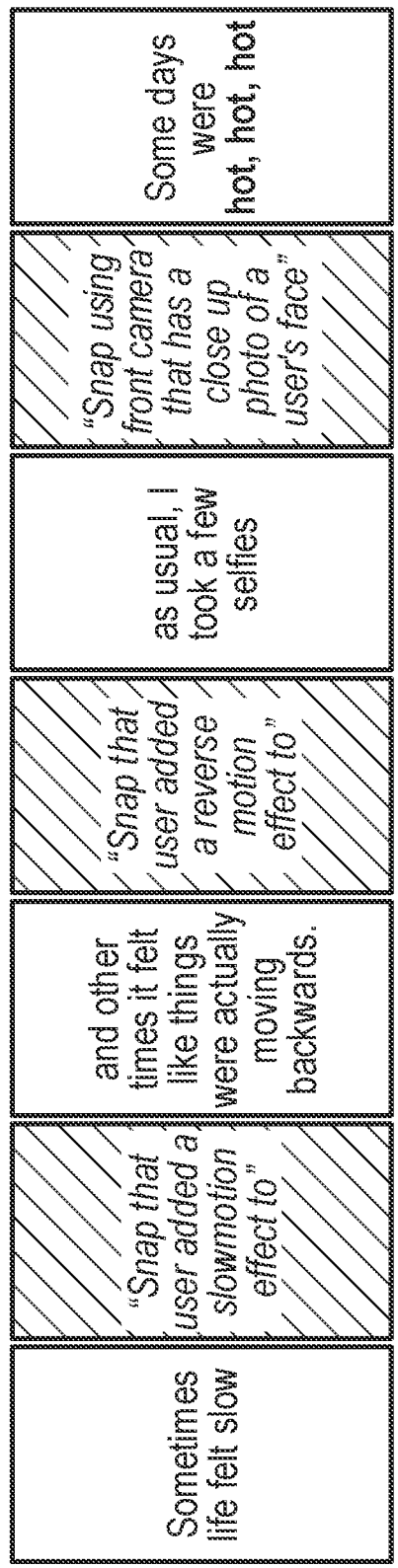
Figure 5E:
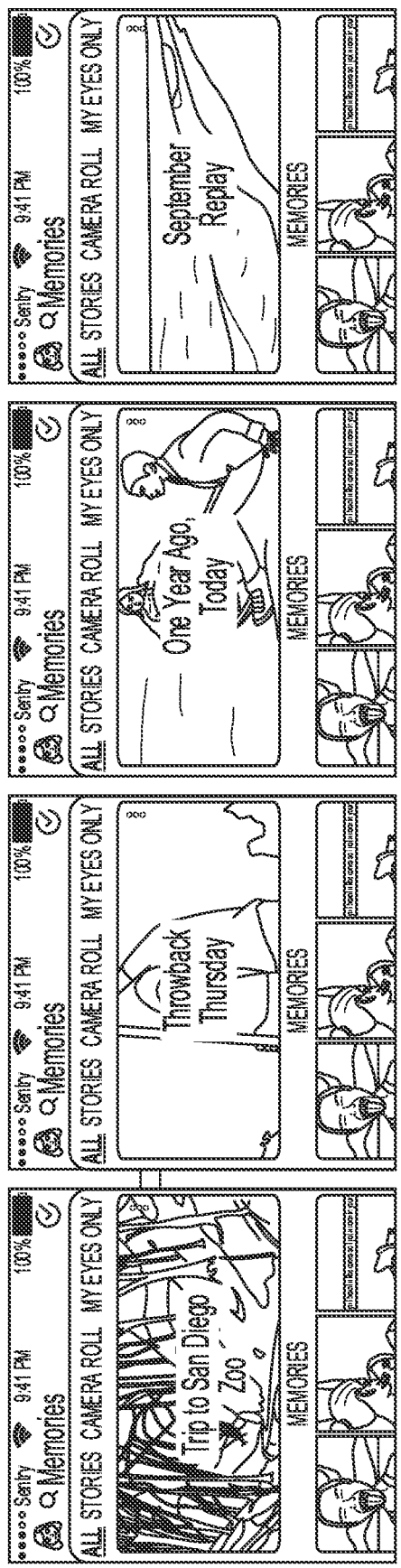

FIGS. 5B-5D illustrate an example of a "Year End Story" media content collection, as well as some of the narrative group criteria that may be utilized by embodiments of the present disclosure to select (415) media content items to generate (420) a media content collection. In these examples, the media content collection includes a series of Title cards (darker screens) that introduce a narrative group category followed by a user's media content items ("Snaps" in these examples) associated with the narrative group's criteria and are selected by the system to generate (420) the media content collection using the user's media content. For the sake of illustration, these examples show only a single sample media content item that describes (in text) the narrative group criteria that a media content item would have for each narrative group, though an actual media content item would typically contain an image, audio, video, or other actual content.

In FIG. 5B, for example, the collection begins (proceeding left to right) with a title card introducing the entire media collection: "I made it though 2017 . . . " followed by a title card stating "I had a few early mornings" preceding one or more media content items satisfying the narrative group criteria of "being taken between 4 AM and 6 AM." In operation, the system may identify this information (and other data for criteria described below) from the timestamp on the media content item file, as well as from metadata stored with (or in association with) the media content item file. FIG. 5B proceeds by next displaying the "I worked hard" title card followed by media content associated having keywords related to "working," and a title card "I played even harder" followed by media content where the system performs an object recognition analysis on image content within media content items to identify media content associated with "clubbing or partying." Embodiments of the present disclosure may use any combination of text recognition, image recognition, audio analysis, and/or other identification techniques to identify and select media content items for association with various narrative group criteria.

In FIG. 5C, the content collection continues with a title card stating "Sometimes life felt slow" followed by media content to which a particular filter was applied, namely a "slowmotion effect," in this case. Similarly, the collection includes a title card referencing "moving backwards" followed by media content to which a "reverse motion" effect filter was applied. FIG. 5C next includes a title card referencing "selfies," associated with media content generated taken using a front-facing camera of the user's mobile computing device along with an image of the user's face (e.g., determined using image recognition). FIG. 5C next includes a title card referencing "hot" days, with the continuation of the collection in FIG. 5D including media content captured while the temperature (e.g., measured by a temperature sensor coupled to the user's mobile computing device) exceeded 80 degrees, and/or the user applied a temperature-related filter.

FIG. 5D continues with media content taken on the user's birth date, media content having at least a predetermined amount of editing by the user ("brush strokes" and/or applied "stickers," in this example), media content containing a particular keyword (i.e., "lit" in this case), and finally media content containing an image of a sunset as determined via image recognition.

As shown above, the system may operate in conjunction with a variety of narrative group criteria. In other examples, the system may select narrative group criteria that selects content based on "late nights" (similar to the "early mornings" example above) based on the timestamp of the media content, and biasing selection of media content towards picking content generated later in the day. For example, an image captured at 3 AM may be selected over an image captured at 1 AM. Likewise, the system may prioritize media content based on filters and other types of overlays (e.g., "sticker" images) applied to the content. The system may also select or prioritize selection of media content based on whether a front-facing or rear-facing camera was used to capture an image (e.g., to help select images of the user as opposed to images that do not contain the user). The system may also analyze the content of a media content in making a selection, such as analyzing text, video, audio, images (e.g., emoji) and other characteristics of the content. For example, in looking for "upbeat" or "happy" images, the system may search for media content containing "smiling" emojis or keywords indicating the user is happy.

The system may likewise analyze the settings of a user's mobile computing device in conjunction with media content created by the device to select media content. For example, the system may introduce a title card stating: "I took a closer look" and follow it with media content captured by a camera zoomed in over 50% of the zoom threshold. The system may also utilize information from sensors coupled to the user's computing device when the media content was generated, such as temperature sensors (described above), geolocation data (e.g., determining where an image was captured, such as an airport or hotel to indicate traveling/vacationing), velocity/altitude (e.g., indicating travel, flying, etc.), and data from other sensors, such as described below with reference to FIG. 7.

The system may use image analysis (and other analysis techniques) to select media content items with a bias toward (or against): groups of people in an image, and/or faces exhibiting smiles/happy emotion. The system may also select media content based on the characteristics of media overlays applied to the content, such as custom stickers made by a user as compared to "standard" stickers provided by the system or bitmoji stickers (showing an avatar of the user). For example, the system may opt to select images having custom stickers or bitmoji as having a more "personal" tie to the user.

FIG. 5E illustrates exemplary screenshots of four media collections. In this example, each media collection ("story") is presented in a "memories" gallery for a user to view. The featured story tile (the main tile visible beneath the title) may include auto-playing videos and photos (e.g., that play media content from the story that transition from one to the next with autoplaying cross-fade animation). This autoplaying video may loop back to the beginning when it gets to the end. A user may select (e.g., tap on the touchscreen of the user's mobile computing device) a Featured Story Tile to bring it full screen. The user may then skip through the story to view the media content items therein, or dismiss the story from the menu.

Figure 5F:
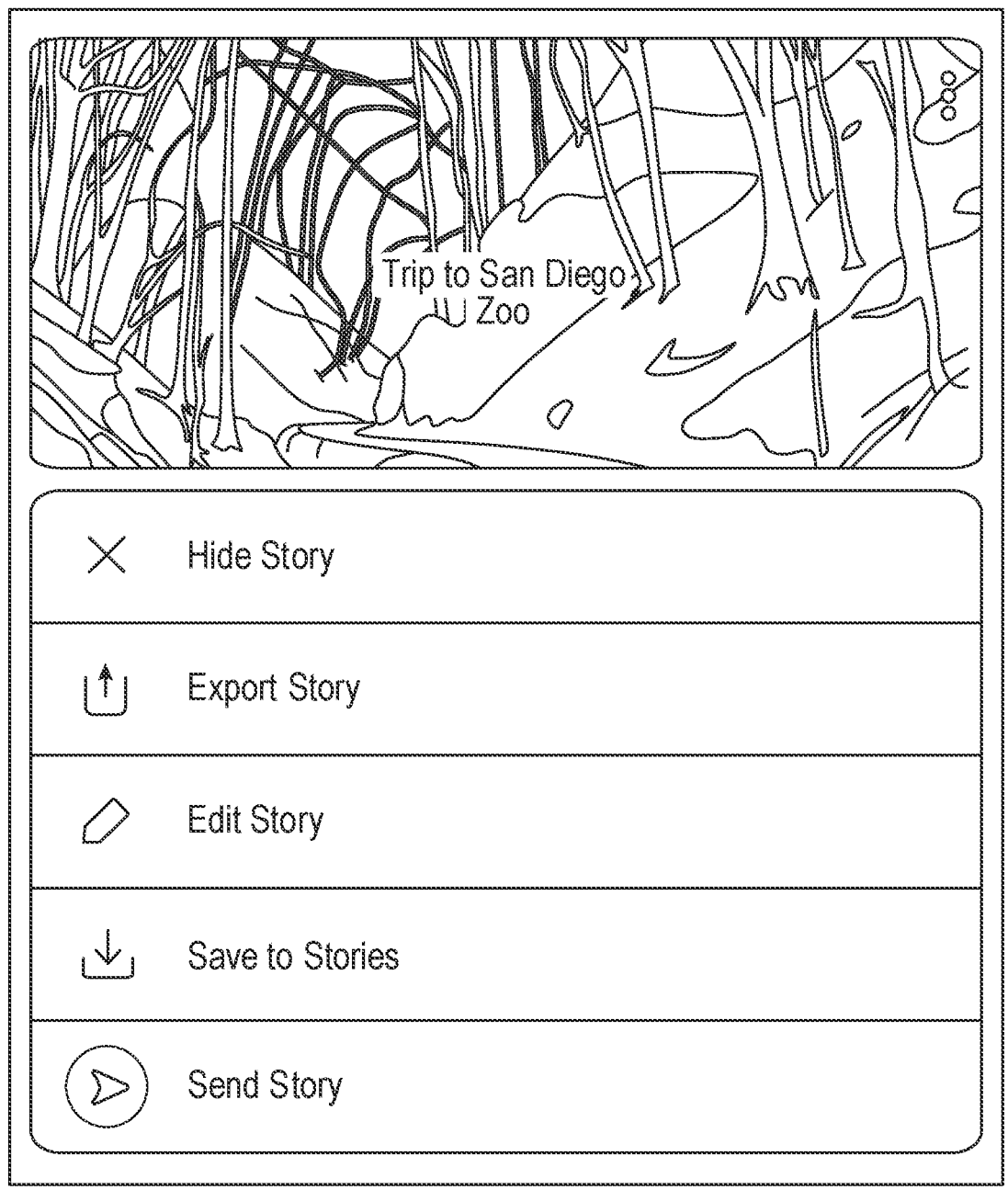

FIG. 5F illustrates a screenshot showing a menu of user options for interacting with a media content collection. In this example, the user may opt to hide the story from the menu, export the story (e.g., to local storage on the user's mobile device, edit the story, save the story, or send the story to another user.

Figure 5G:
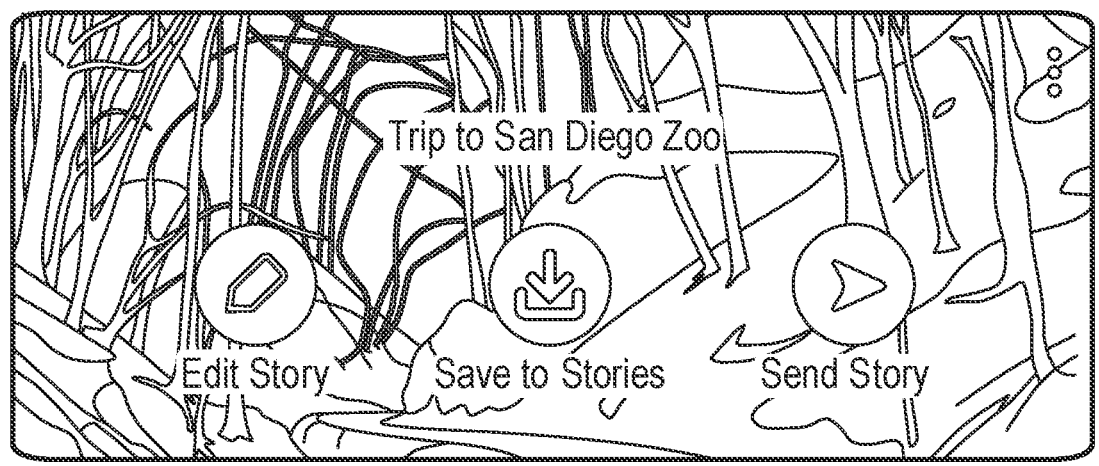

FIG. 5G illustrates another user menu. In this example, the menu may be displayed to the user after the user opens the media content collection ("story") for the first time and finishes watching it or exits. In this case, the Featured Story Tile will animate into the post-view state shown in FIG. 5G, where the user is displayed options to: Edit Story; Save to Stories; and Send Story. In this example, If a user saves the Featured Story, it will save to the user's "My Stories" section. In some embodiments, the system may stop displaying Featured Stories in response to a variety of events, such as: the story has been viewed in full by the user, the story has been saved or sent by the user, the user hides the story, the Story has been featured for a predetermined amount of time (e.g., 24 hours) and the featured tile has been seen at least once by the user but not been interacted with, or the system determines the story is no longer relevant. For example, the system may determine that a "1 year ago story" cannot be kept the following day, because it will no longer be 1 year ago.

Figure 5H:
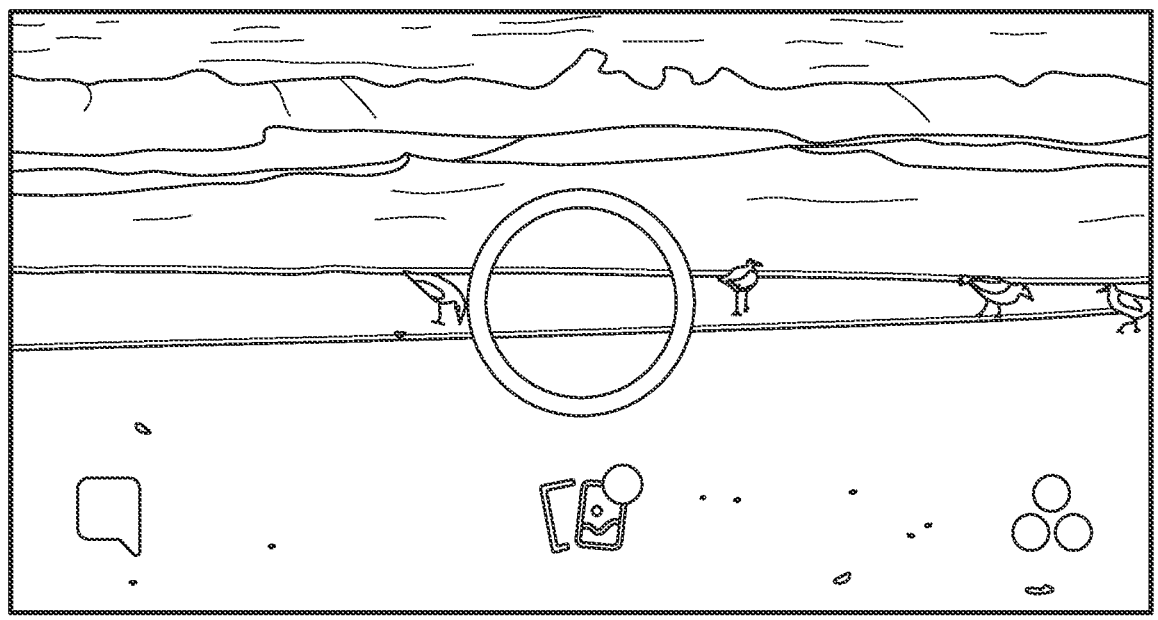

The system may visually tag media content collections to help notify a user of its existence or remind the user to view the collection. In FIG. 5H, for example, the system "badges" the "Memories" icon (in the bottom middle) to indicate that the user has a featured story that the user has not yet viewed. In this example, if the user selects the Memories icon while it is badged, the user is brought to the Memories page with the Featured Story. The badging may be removed by the system in response to the user selecting the Memories icon and/or viewing the featured story.

Figure 5I:
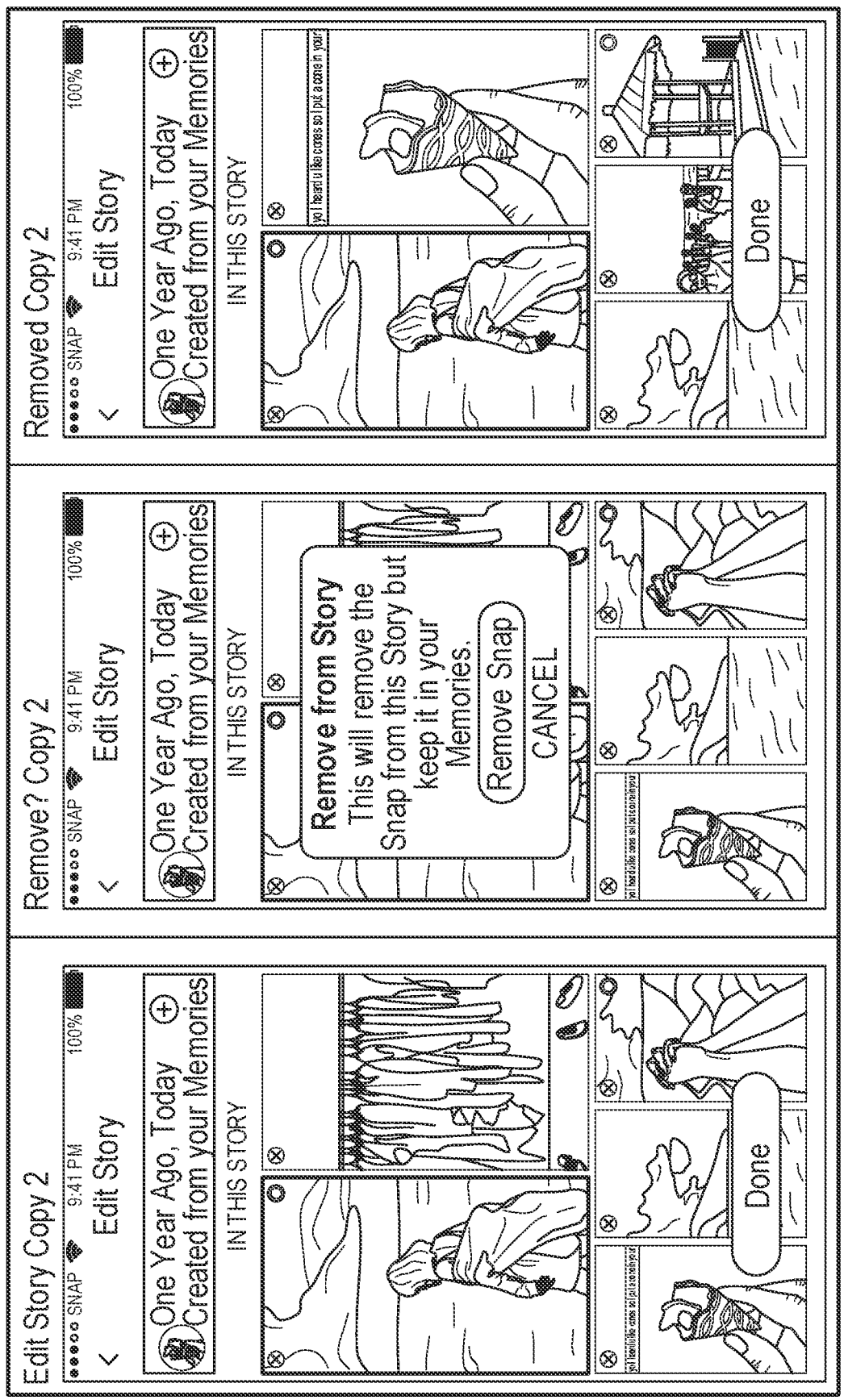

The system may allow the user to edit a media content collection, including adding or removing media content items from the collection, editing individual media content items, and adding, removing, or altering title cards. FIG. 5I illustrates an example of a series of screenshots showing the editing of a media content collection by a user. In this example, the user selects the "Edit Story" option after viewing the story. The user then removes the second Snap in the story by tapping on the "x" icon, prompting a confirmation pop-up (shown in the middle screenshot). The user selects the "Remove Snap" button to remove the selected media content item from the Story Editor (the Edit Story screen syncs the update).

Figure 5J:
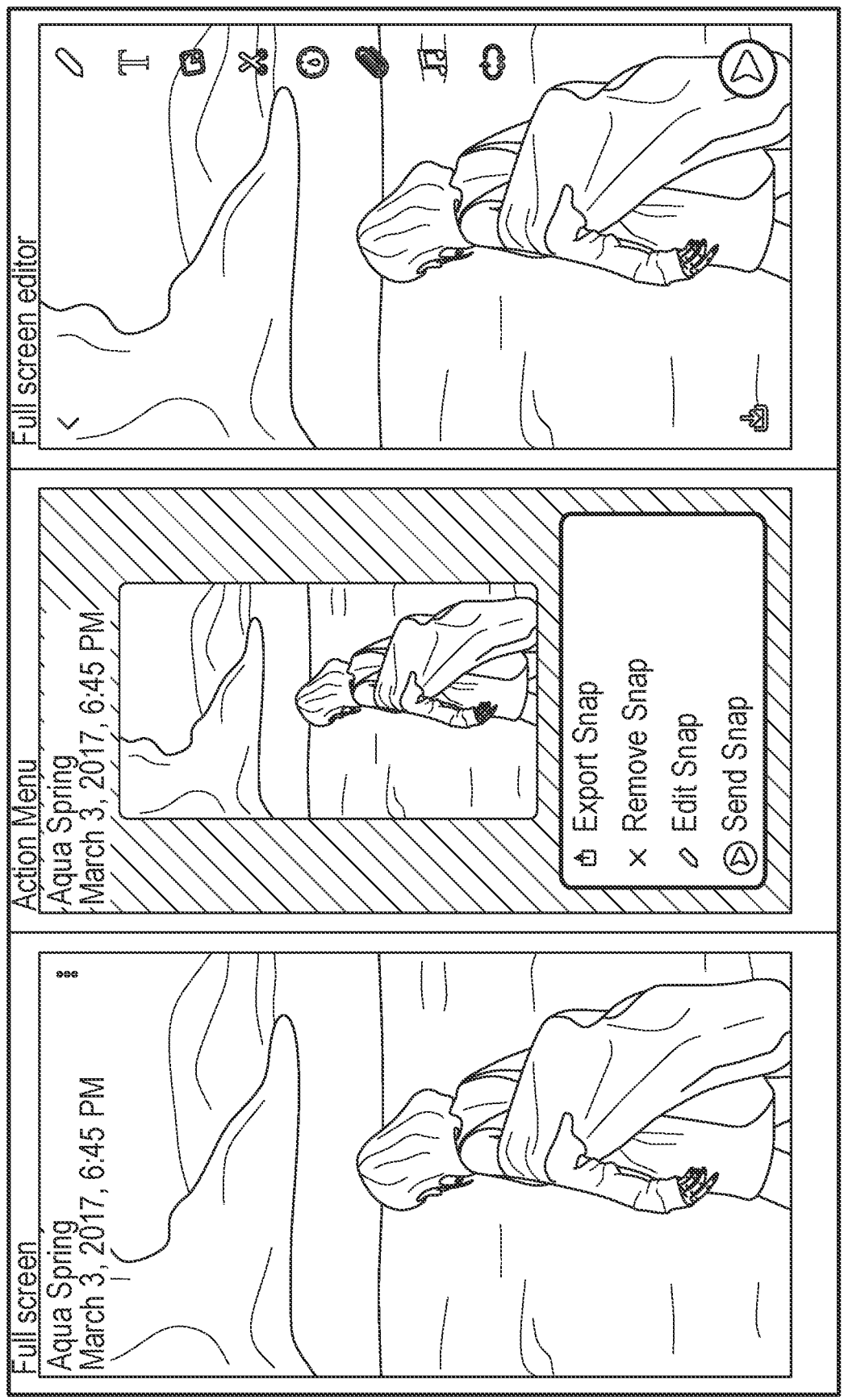

The user then selects the first (upper-left) snap, which brings up a fullscreen preview screen as shown in the first (leftmost) screenshot of FIG. 5J. The user selects the Snap to see the action menu (second/middle screenshot) and selects "Edit Snap" in the action menu to see the fullscreen Creative tools menu (shown on the third screenshot). The user may proceed to make various edits to the image (e.g., cropping, adding text, modifying brightness/contrast, adding content, removing content, modifying content, etc.). Once the user has completed the edits, the user saves the edits and selects and option to update the story.

The system may display (425) the media content collection in a variety of ways, including those described above. For example, the system may display (425) a media content collection on the display screen of a computing device of a use associated with the media content items in the collection.

The system may receive (430) various instructions from the user with regards to editing, hiding, and sharing media content collections, as described above. For example, the user may send instructions (via the user's computing device) to the system to share the media collection with one or more other users (e.g., the user's friends). In response to the instructions, the system may distribute (435) the media content collection to the respective computing devices of the identified recipients and cause the collection to display on the display screens of the devices.

Software Architecture

Figure 6:
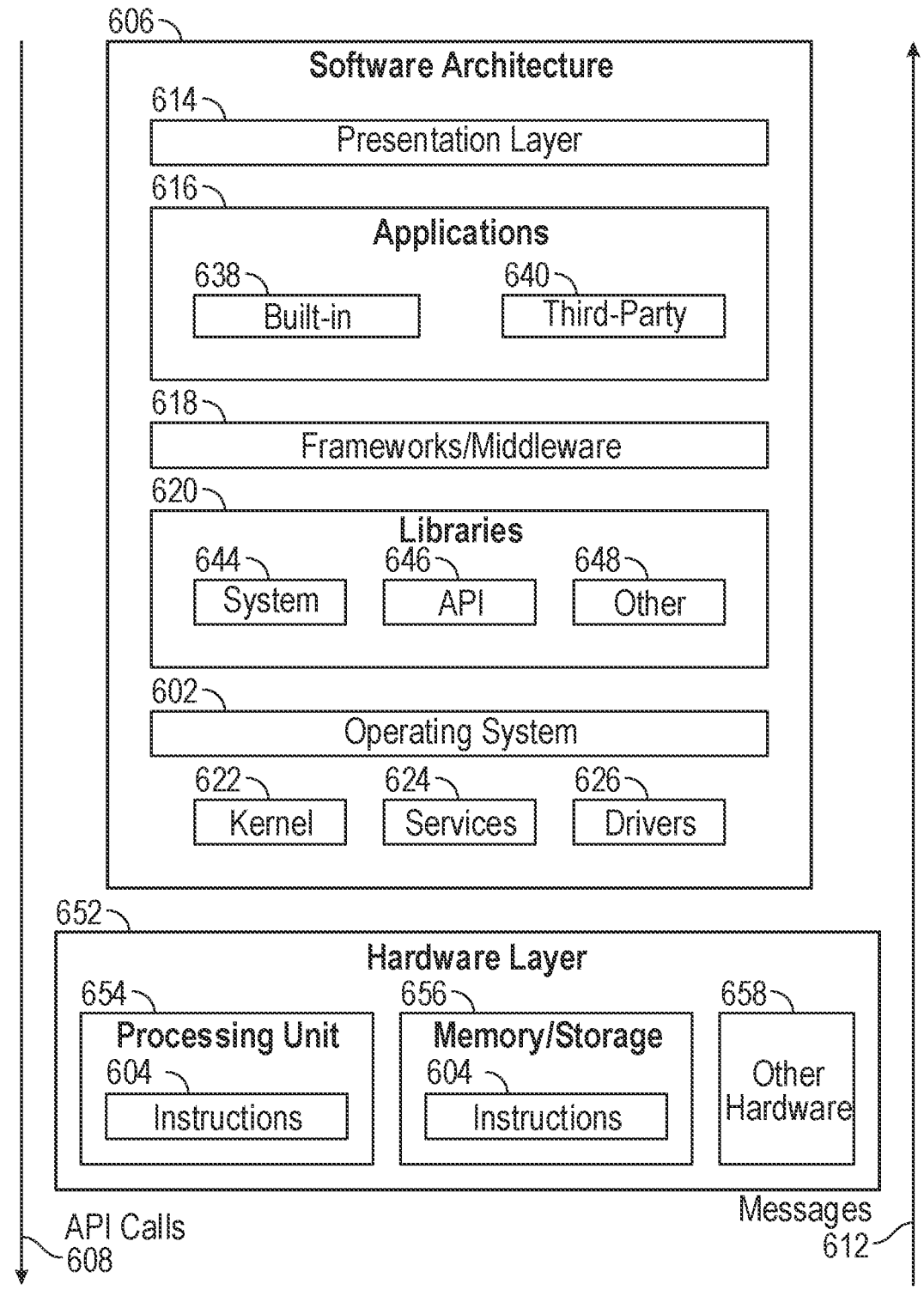
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
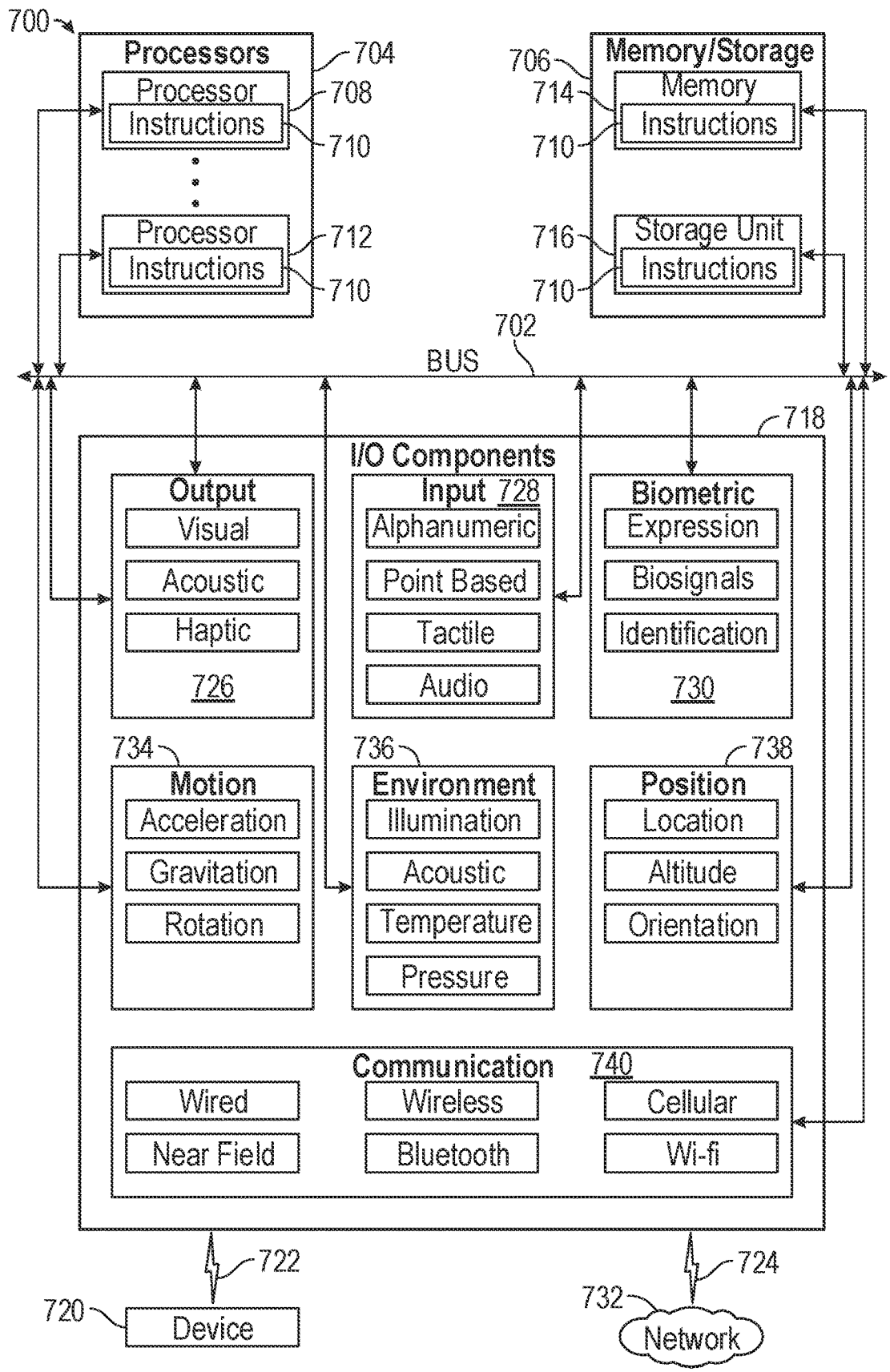
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for generating a media content collection, the method comprising:
   selecting a plurality of media content items associated with a user, each media content item having:
      a time attribute indicating when the media content item was generated;
      a location attribute indicating where the media content item was generated;
      a content type attribute indicating a type of content in the media content item; and
      a narrative group attribute indicating one or more narrative groups with which the media content item is associated;
   organizing the plurality of media content items into categories based on the time attribute, the location attribute, and the content type attribute;
   determining an engagement score for each media content item in the plurality of media content items;
   ranking the plurality of media content items within each category based on the determined engagement score determined for each media content item in the plurality of media content items;
   selecting, from each category, a predetermined number of top-ranked media content items, wherein for categories based on a common time attribute, a common location attribute, or a common content type attribute, no more than a predetermined number of media content items are selected from any single category;
   determining a diversity score for each media content item in the plurality of media content items based on a weighted combination of respective time attribute, respective location attribute, respective content type attribute and respective narrative group attribute of the media content item; and generating the media content collection comprising a subset of the predetermined number of top-ranked media content items, wherein the subset comprises media content items having a diversity score above a predetermined threshold, the media content collection having a threshold level of diversity based on the weighted combination of respective time attribute, respective location attribute, respective content type attribute and respective narrative group attribute of the media content item.

2. The method of claim 1, wherein the diversity score for each media content item in the plurality of media content items is further based on an engagement score associated with the media content item.

3. The method of claim 2, wherein determining an engagement score for a media content item is based on at least one of:
 a number of times the media content item was viewed;
 a number of times the media content item was distributed;
 a number of comments associated with the media content item;
 a keyword in the media content item;
 an image in the media content item;
 video in the media content item; or
 audio in the media content item.

4. The method of claim 1, wherein the threshold level of diversity requires the subset of media content items having the diversity score above the predetermined threshold to include media content items associated with a minimum number of different narrative groups.

5. The method of claim 1, wherein the narrative group attribute for each media content item indicates an event associated with the media content item, and wherein the threshold level of diversity requires the subset of media content items having the diversity score above the predetermined threshold to include media content items associated with a minimum number of different events.

6. The method of claim 5, wherein the event is a holiday, vacation, or life event.

7. The method of claim 1, further comprising:
 displaying the media content collection on a display screen of a computing device of the user.

8. The method of claim 7, wherein displaying the media content collection comprises:
 presenting a title for the media content collection;
 presenting a first media content item from the subset of media content items having the diversity score above the predetermined threshold;
 presenting one or more additional media content items from the subset of media content items having the diversity score above the predetermined threshold in sequence after the first media content item; and
 presenting one or more transition effects when transitioning between presenting the subset of media content items having the diversity score above the predetermined threshold, wherein the one or more transition effects include at least one of:
 fading out a currently presented media content item while fading in a next media content item;
 sliding a currently presented media content item off of the display screen while sliding a next media content item onto the display screen; or
 zooming out of a currently presented media content item while zooming into a next media content item.

9. A system for generating a media content collection, the system comprising:
 a processor;
 memory storing instructions thereon, which, when executed by the processor, cause the system to perform method operations comprising:
 selecting a plurality of media content items associated with a user, each media content item having:
 a time attribute indicating when the media content item was generated;
 a location attribute indicating where the media content item was generated;
 a content type attribute indicating a type of content in the media content item; and
 a narrative group attribute indicating one or more narrative groups with which the media content item is associated;
 organizing the plurality of media content items into categories based on the time attribute, the location attribute, and the content type attribute;
 determining an engagement score for each media content item in the plurality of media content items;
 ranking the plurality of media content items within each category based on the determined engagement score for each media content item in the plurality of media content items;
 selecting, from each category, a predetermined number of top-ranked media content items, wherein for categories based on a common time attribute, a common location attribute, or a common content type attribute, no more than a predetermined number of media content items are selected from any single category;
 determining a diversity score for each media content item in the plurality of media content items based on a weighted combination of respective time attribute, respective location attribute, respective content type attribute and respective narrative group attribute of the media content item; and
 generating the media content collection comprising a subset of the predetermined number of top-ranked media content items, wherein the subset comprises media content items having a diversity score above a predetermined threshold, the media content collection having a threshold level of diversity based on the weighted combination of respective time attribute, respective location attribute, respective content type attribute and respective narrative group attribute of the media content item.

10. The system of claim 9, wherein the diversity score for each media content item in the plurality of media content items is further based on an engagement score associated with the media content item.

11. The system of claim 10, wherein determining an engagement score for a media content item is based on at least one of:
 a number of times the media content item was viewed;
 a number of times the media content item was distributed;
 a number of comments associated with the media content item;
 a keyword in the media content item;
 an image in the media content item;
 video in the media content item; or
 audio in the media content item.

12. The system of claim 9, wherein the threshold level of diversity requires the subset of media content items having the diversity score above the predetermined threshold to include media content items associated with a minimum number of different narrative groups.

13. The system of claim 9, wherein the narrative group attribute for each media content item indicates an event associated with the media content item, and wherein the threshold level of diversity requires the subset of media content items having the diversity score above the predetermined threshold to include media content items associated with a minimum number of different events.

14. The system of claim 13, wherein the event is a holiday, vacation, or life event.

15. The system of claim 9, wherein the instructions, when executed, cause the system to perform further additional method operations comprising:
    displaying the media content collection on a display screen of a computing device of the user.

16. The system of claim 15, wherein displaying the media content collection comprises:
    presenting a title for the media content collection;
    presenting a first media content item from the subset of media content items having the diversity score above the predetermined threshold;
    presenting one or more additional media content items from the subset of media content items having the diversity score above the predetermined threshold in sequence after the first media content item; and
    presenting one or more transition effects when transitioning between presenting the subset of media content items having the diversity score above the predetermined threshold, wherein the one or more transition effects include at least one of:
    fading out a currently presented media content item while fading in a next media content item;
    sliding a currently presented media content item off of the display screen while sliding a next media content item onto the display screen; or
    zooming out of a currently presented media content item while zooming into a next media content item.

17. A system for generating a media content collection, the system comprising:
    means for selecting a plurality of media content items associated with a user, each media content item having:
    a time attribute indicating when the media content item was generated;
    a location attribute indicating where the media content item was generated;
    a content type attribute indicating a type of content in the media content item; and
    a narrative group attribute indicating one or more narrative groups with which the media content item is associated;
    means for organizing the plurality of media content items into categories based on the time attribute, the location attribute, and the content type attribute;
    means for determining an engagement score for each media content item in the plurality of media content items;
    means for ranking the plurality of media content items within each category based on the determined engagement score for each media content item in the plurality of media content items;
    means for selecting, from each category, a predetermined number of top-ranked media content items, wherein for categories based on a common time attribute, a common location attribute, or a common content type attribute, no more than a predetermined number of media content items are selected from any single category;
    means for determining a diversity score for each media content item in the plurality of media content items based on a weighted combination of respective time attribute, respective location attribute, respective content type attribute and respective narrative group attribute of the media content item; and
    means for generating the media content collection comprising a subset of the predetermined number of top-ranked media content items, wherein the subset comprises media content items having a diversity score above a predetermined threshold, the media content collection having a threshold level of diversity based on the weighted combination of respective time attribute, respective location attribute, respective content type attribute and respective narrative group attribute of the media content item.

18. The system of claim 17, wherein the diversity score for each media content item in the plurality of media content items is further based on an engagement score associated with the media content item.

19. The system of claim 18, wherein determining an engagement score for a media content item is based on at least one of:
    a number of times the media content item was viewed;
    a number of times the media content item was distributed;
    a number of comments associated with the media content item;
    a keyword in the media content item;
    an image in the media content item;
    video in the media content item; or
    audio in the media content item.

20. The system of claim 17, wherein the threshold level of diversity requires the subset of media content items having the diversity score above the predetermined threshold to include media content items associated with a minimum number of different narrative groups.

* * * * *